(12) United States Patent
Herrmann et al.

(10) Patent No.: US 6,336,394 B1
(45) Date of Patent: Jan. 8, 2002

(54) DEVICE FOR THE FEEDING OF MASH

(75) Inventors: Hans Herrmann, Sommerach; Franz Asbeck, Prichsenstadt; August Lenz, Jr., Kitzingen, all of (DE)

(73) Assignee: Hrch. Huppmann GmbH (DE)

( * ) Notice: Subject to any disclaimer, the term of this patent is extended or adjusted under 35 U.S.C. 154(b) by 0 days.

(21) Appl. No.: 09/529,531

(22) PCT Filed: Jul. 2, 1999

(86) PCT No.: PCT/DE99/02108

§ 371 Date: Mar. 14, 2000

§ 102(e) Date: Mar. 14, 2000

(87) PCT Pub. No.: WO00/04130

PCT Pub. Date: Jan. 27, 2000

(30) Foreign Application Priority Data

Jul. 16, 1998 (DE) ......................................... 198 31 870

(51) Int. Cl.[7] ................................................. C12C 7/17
(52) U.S. Cl. ....................................... 99/277.2; 99/277
(58) Field of Search ........................... 99/277.2, 277.1, 99/277, 276, 278; 426/29, 431, 489, 490, 495

(56) References Cited

U.S. PATENT DOCUMENTS 5,794,518 A * 8/1998 Stippler et al. ............ 99/277.2

FOREIGN PATENT DOCUMENTS

| DE | 628 602 | 4/1936 |
| DE | 676 612 | 6/1939 |
| DE | 83 26 604 | 1/1984 |

* cited by examiner

*Primary Examiner*—Reginald L. Alexander
(74) *Attorney, Agent, or Firm*—McGlew and Tuttle, P.C.

(57) ABSTRACT

A device for the feeding of mash into a lauter tun is provided with a mash pump, a main pipe (12) which is connected to the mash pump and at least two partial stream pipes (6) which connect the main pipe (12) to a feed opening (19) in the lauter tun (2) in each case. When the mash pump is in operation, mash is fed from a mash container into the lauter tun (2) via the main pipe (12) and the partial stream pipes (6). To enable the mash to flow into the lauter tun (2) in as uniform a manner as possible a buffer vessel (22) is arranged between the main pipe (12) and the partial stream pipes (6).

23 Claims, 5 Drawing Sheets

DEVICE FOR THE FEEDING OF MASH

FIELD OF THE INVENTION

The invention relates to a device for the feeding of mash into a lauter tun with a mash pump, a main pipe which is connected to the mash pump and at least two partial stream pipes which connect the main pipe to a feed opening in the lauter tun in each case.

BACKGROUND OF THE INVENTION

The residence of the mash in the lauter tun is the precondition for a subsequent clarification of the wort. For this purpose the mash is pumped out of a mash container by means of a mash pump and pumped into the lauter tun by means of a pipe system which is connected to feed openings of the lauter tun. In order to distribute the mash as evenly as possible in the lauter tun and thereby achieve an even filter layer, the known installations have several feed openings in the lauter tun so that the mash can flow into the Tauter tun at several places at the same time. A partial stream pipe which is connected to a main pipe is connected to each of the feed openings so that when the mash pump is operating, mash can be fed from the mash container into the lauter tun by-means of the main pipe and the partial stream pipes.

The fact that the partial stream pipes are connected to the main pipe in different places is a drawback of the known devices for the feeding of mash. As the total pressure of the liquid in the main pipe decreases with increasing distance from the mash pump because of the volume streams drawn off at the individual partial stream pipes, the mash at the various partial stream pipes does not flow in with the same initial pressure.

As a result, the different pressure conditions in the various partial stream pipes cause the mash to flow out unevenly at the various feed openings of the lauter tun. Because of the uneven feeding of mash to the various feed openings, when the mash is being discharged an uneven filter layer forms on the base of the lauter tun, which has a negative influence on the outcome of clarification.

SUMMARY AND OBJECTS OF THE INVENTION

The primary object of the present invention is to provide a generic device for the feeding of mash by means of which a more even filter layer is formed when the mash is discharged.

According to the invention a device is provided for the feeding of mash into a lauter tun with a mash pump, a main pipe which is connected to the mash pump and at least two partial stream pipes which connect the main pipe to a feed opening in the lauter tun in each case. This arrangement allows the mash to be fed from a mash container into the lauter tun via the main pipe and the partial stream pipes when the mash pump is in operation. A buffer vessel is provided between the main pipe and the partial stream pipes. The mash flows out of the main pipe into the buffer vessel to which all partial stream pipes are connected. As a result, after transient processes have died away at the beginning of mash discharge a uniform total pressure forms in the buffer vessel so that the mash flows into all partial stream pipes with the same initial pressure. By this means the pressure conditions at the inflow openings of all partial stream pipes, i.e. at the transition from the buffer vessel to the individual partial stream pipes, coincide so that an even filter layer is formed.

The even formation of the filter layer is further improved when all partial stream pipes further have the same line resistance, since by this means the pressure conditions at all feed openings of the lauter tun also substantially coincide, so that the mash flows into the lauter tun through all feed openings in substantially identical conditions.

The line resistance of the partial stream pipes is substantially determined by their pipe diameter and the pipe length. For this reason the partial stream pipes should preferably have substantially the same pipe diameter and the same pipe length so that the same line resistance results. This may be achieved particularly simply, for example, in that all partial stream pipes are manufactured substantially of identical construction.

In principle the feed openings may be arranged anywhere in the lauter tun. To prevent the separation of the mash with the disadvantageous consequences thereof during mash discharge it is advantageous to arrange the feed openings in per se known manner on the underside of the lauter tun.

A relatively uniform distribution of the mash accompanied by relatively little manufacturing outlay is achieved at the same time when the lauter tun has at least two feed openings for the mash feed, all of which are arranged on an imaginary circular line, the center point of the circular line lying on the center axis of the lauter tun. By means of the circular symmetrical arrangement of the feed openings, a uniform flow path distribution is produced when the mash flows along the base of the lauter tun. For this purpose the feed openings should preferably be distributed on the circular line with a uniform angular pitch. The number of feed openings should be matched to the size of the lauter tun in particular.

In principle the buffer vessel may be arranged anywhere in the mashhouse installation. In order to be able to manufacture the partial stream pipes substantially of identical construction, the buffer vessel should preferably be arranged centrically to the center axis of the lauter tun, as the distance from one point of the center axis of the lauter tun to feed openings arranged symmetrically in the lauter tun base is substantially always the same.

According to a preferred embodiment the buffer vessel is substantially circular-symmetrical in form. The circular-symmetrical form of the buffer vessel ensures that the inflow openings of the various partial stream pipes, i.e. the transition from the buffer vessel to the partial stream pipes, have substantially the same distance from the individual feed openings of the lauter tun in each case. If a circular-symmetrical buffer vessel is arranged centrically to the center axis of the lauter tun in the brewery installation, it is ensured that partial stream pipes of substantially identical construction can be used to connect the buffer vessel to the individual feed openings and hence all partial stream pipes have the same line resistance.

The partial stream pipes should be as short as possible so as to permit line resistances which are as low as possible. In other words this means that the buffer vessel should be arranged centrically to the base of the lauter tun at the smallest possible distance, i.e. underneath the lauter tun. As in many brewery installations the main shaft of the lauter tun drive runs along the center axis of the lauter tun directly underneath the base of the lauter tun, in these cases the buffer vessel should preferably have a tubular passage, the diameter of which is at least slightly larger than the diameter of the main shaft of the lauter tun drive. As a result, the main shaft of the lauter tun drive may run in this sleeve-shaped passage of the buffer vessel so that the arrangement of the buffer vessel in the region directly underneath the lauter tun is possible. If the main shaft runs differently, if it is led into the lauter tun from the top for example, the passage may be omitted.

The buffer vessel may of course be formed as a separate component and in principle be arranged in any position of the mashhouse in the form of a correspondingly designed container. Since, however, the lauter collecting vessel of most known brewery installations is also arranged centrically to the center axis of the lauter tun underneath the base of the lauter tun and has a passage through which the main shaft of the lauter tun drive may pass, to reduce production costs it is advantageous to combine the buffer vessel according to the invention and the lauter collecting vessel of a brewery installation in a two-chamber vessel, the chamber for receiving the mash and the chamber for receiving the wort being separated from each other in pressure-tight manner by at least one partition, so that mash and wort are not mixed. The two-chamber vessel then preferably has a common passage through both chambers in which the main shaft runs.

According to a preferred embodiment of the two-chamber vessel the chamber for receiving the mash is arranged underneath the chamber for receiving the wort in the two-chamber vessel. The arrangement may, however, also be reversed if required.

A particularly simple construction of the two-chamber vessel is produced when the chamber for receiving the mash and the chamber for receiving the wort have substantially the same internal and/or external diameter. By means of this measure the external and/or internal cylinder surfaces of the two-chamber vessel may be formed either as one part, as a section of a pipe for example, or by using identical components for both chambers. If both chambers of the two-chamber vessel have the same internal and external diameter, in particularly simple manner the two chambers may be separated from one another by means of an annular partition. At its internal and/or external diameter the annular partition is connected to the internal and/or external cylinder surfaces of the two chambers in pressure-tight manner. In this case the internal cylinder surface of both chambers can be formed particularly simply in the manner of a one-piece pipe section.

To enable the wort to flow out of the two-chamber vessel's chamber for receiving the wort in pressureless manner the component plane of the partition between the two chambers should run at an angle of 1 to 30° relative to the horizontal plane. The wort located above this partition arranged in inclined manner flows out of the two-chamber vessel in pressureless manner as a result of gravity.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
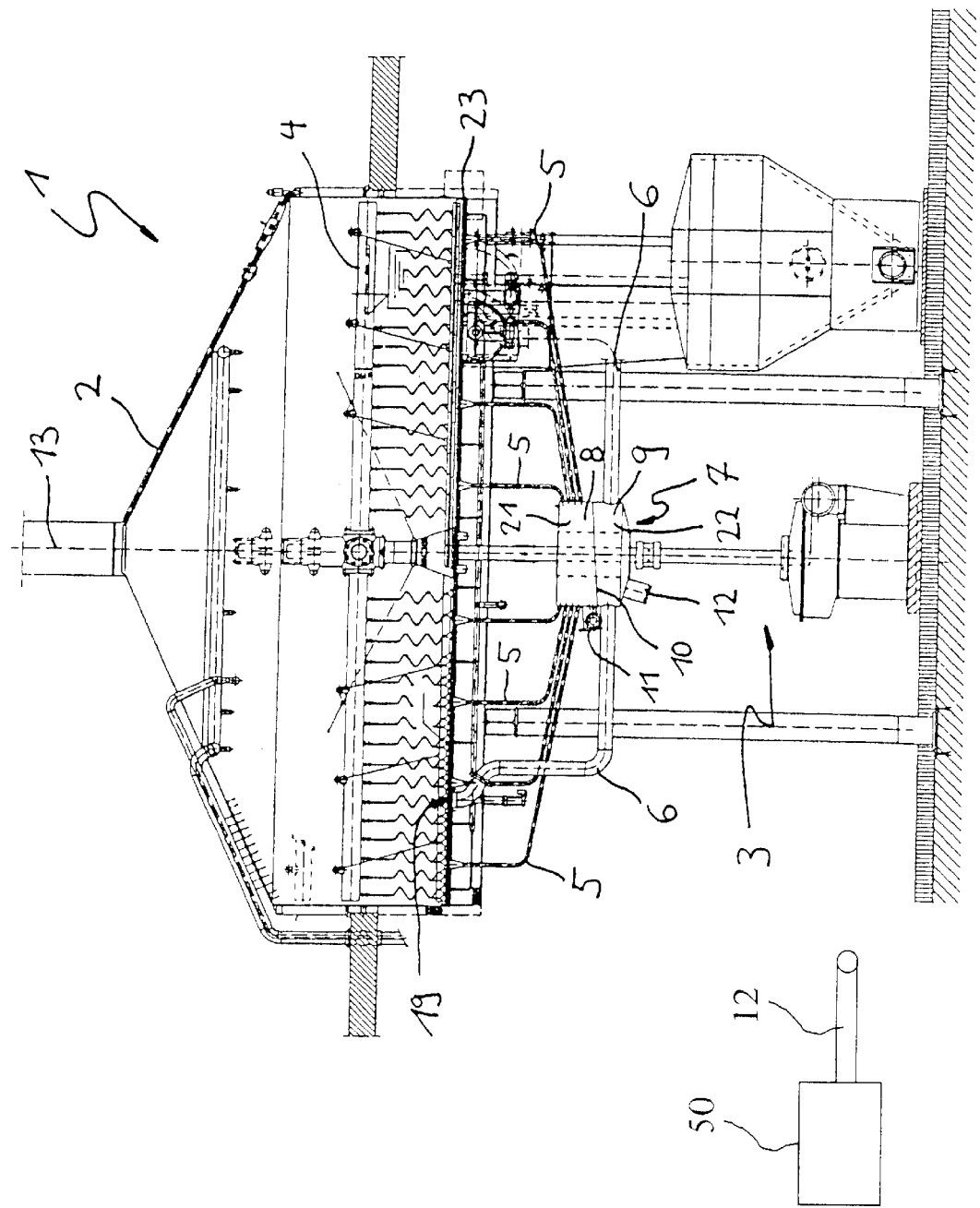
FIG. 1 is a diagrammatic partially sectional side view of a lauter tun installation with a device according to the invention for the feeding of mash.

Referring to the drawings in particular, FIG. 1 shows a diagrammatic view of a lauter tun installation 1 with a lauter tun 2, a lauter tun drive 3 and a breaking-up device 4. The wort may be drawn off from the lauter tun 2 via lauter collecting pipes 5 connected to the base of the lauter tun 2. Four partial stream pipes 6 via which the mash may be fed into the lauter tun 2 are also connected to the underside of the lauter tun 2. The lauter collecting pipes 5 and the partial stream pipes 6 are all connected to a two-chamber vessel 7 with an upper chamber 8 in the form of a lauter collecting vessel 21 for receiving the clarified wort and a lower chamber 9 in the form of buffer vessel 22 for receiving the mash. The two chambers 8 and 9 of the two-chamber vessel 7 which are annular in cross-section are separated from one another in pressure-tight manner by an annular partition 10 so that liquid cannot be exchanged between the two chambers 8 and 9.

From the upper chamber 8 the Wort drawn off via the lauter pipes 5 can be drawn off from the two-chamber vessel 7 via a main lauter pipe which is not shown and is connected to a flange 11. When the mash is discharged it is pumped out of a mash container (not shown) into the main pipe 12 (shown in incomplete manner) by a mash pump 50 so that after the lower chamber 9 of the two-chamber vessel 7 has been filled the mash flows into the lauter tun 2 via the partial stream pipes 6.

In order to be able to use partial stream pipes 6 which are substantially identical in construction the two-chamber vessel 7 is arranged centrically to the center axis 13 of the lauter tun 2.

Figure 2:
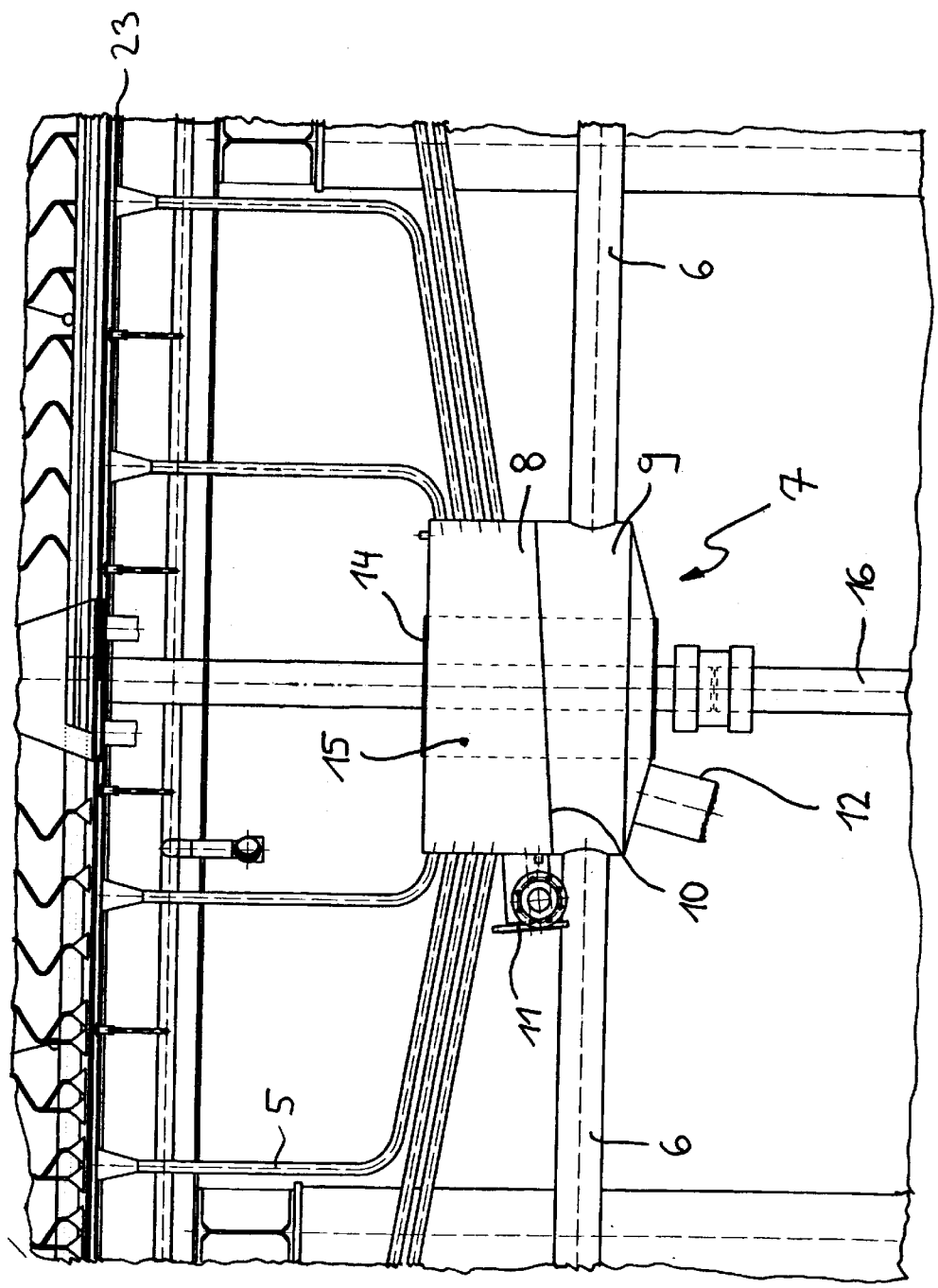
FIG. 2 is a detail from the lauter tun installation according to FIG. 1 with a two-chamber vessel.

FIG. 2 shows a detail of the two-chamber vessel 7. The internal cylinder surfaces of the two chambers 8 and 9 are formed by a continuous pipe section 14. This produces a tubular passage 15, in the center of which the main shaft 16 of the lauter tun drive 3 runs, in the center of the two-chamber vessel 7.

Figure 3:
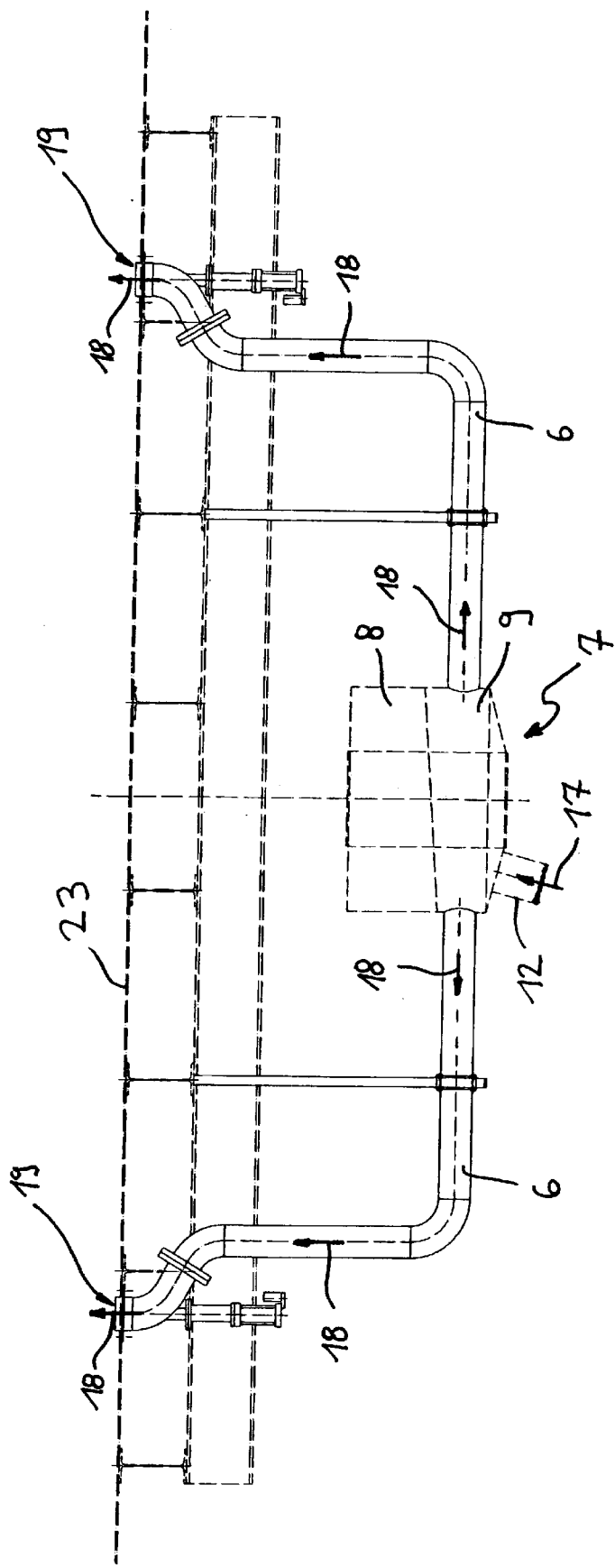
FIG. 3 is a cross-sectional view showing the two-chamber vessel according to FIG. 2 with pipes connected thereto.

FIG. 3 shows the flow pattern of the mash when it is being discharged. The mash is pumped out of the main pipe 12 into the lower chamber 9 of the two-chamber vessel 7 along the flow arrow 17 by the mash pump (rot shown). After the chamber 9 has been filled the mash flows through the partial stream pipes 6 along the flow arrows 18 and at the second end thereof enters the interior of the lauter tun 2 through the feed openings 19. As the partial stream pipes 6 are all substantially identical in construction, i.e. have the same diameter, the same pipe length and the same pipe geometry, the line resistance of all partial stream pipes 6 substantially coincides.

After transient processes at the beginning of mash discharge have died away, a substantially constant total pressure builds up inside the chamber 9 for which reason the mash flows into all partial stream pipes 6 at the same initial pressure. As the line resistance of all partial stream pipes 6 also coincides, the flow conditions of the inflowing mash substantially coincide at all feed openings 19 and an even filter layer forms on the base 23 of the lauter tun 2.

Figure 4:
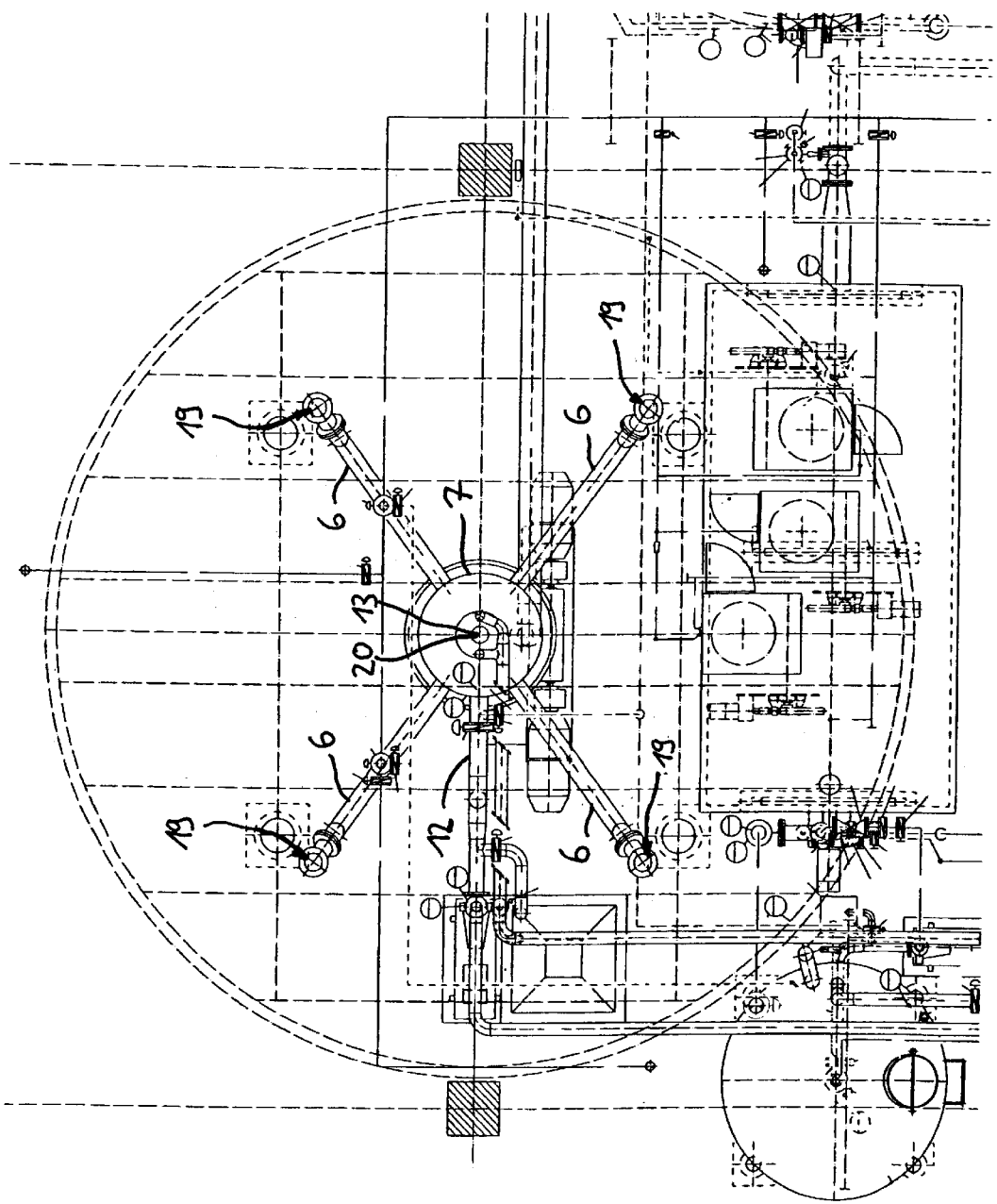
FIG. 4 is a top view of the lauter tun installation according to FIG. 1.

FIG. 4 shows a top view of the lauter tun installation 1 of FIG. 1. Some parts of the installation are indicated solely in broken lines so that the construction of the installation can be identified more satisfactorily. The two-chamber vessel 7, the four partial stream pipes 6 and the main pipe 12 can be seen. The upper ends of the partial stream pipes 6 are connected to the four feed openings 19 in the base 23 of the lauter tun 2.

The feed openings 19 are arranged on an imaginary circular line, the center point 20 of which lies on the center axis 13 of the lauter tun 2.

The circular-symmetrical cross-section of the two-chamber vessel 7 which is arranged centrically to the center axis 13 of the lauter tun 2 can be seen in the top view.

Figure 5:
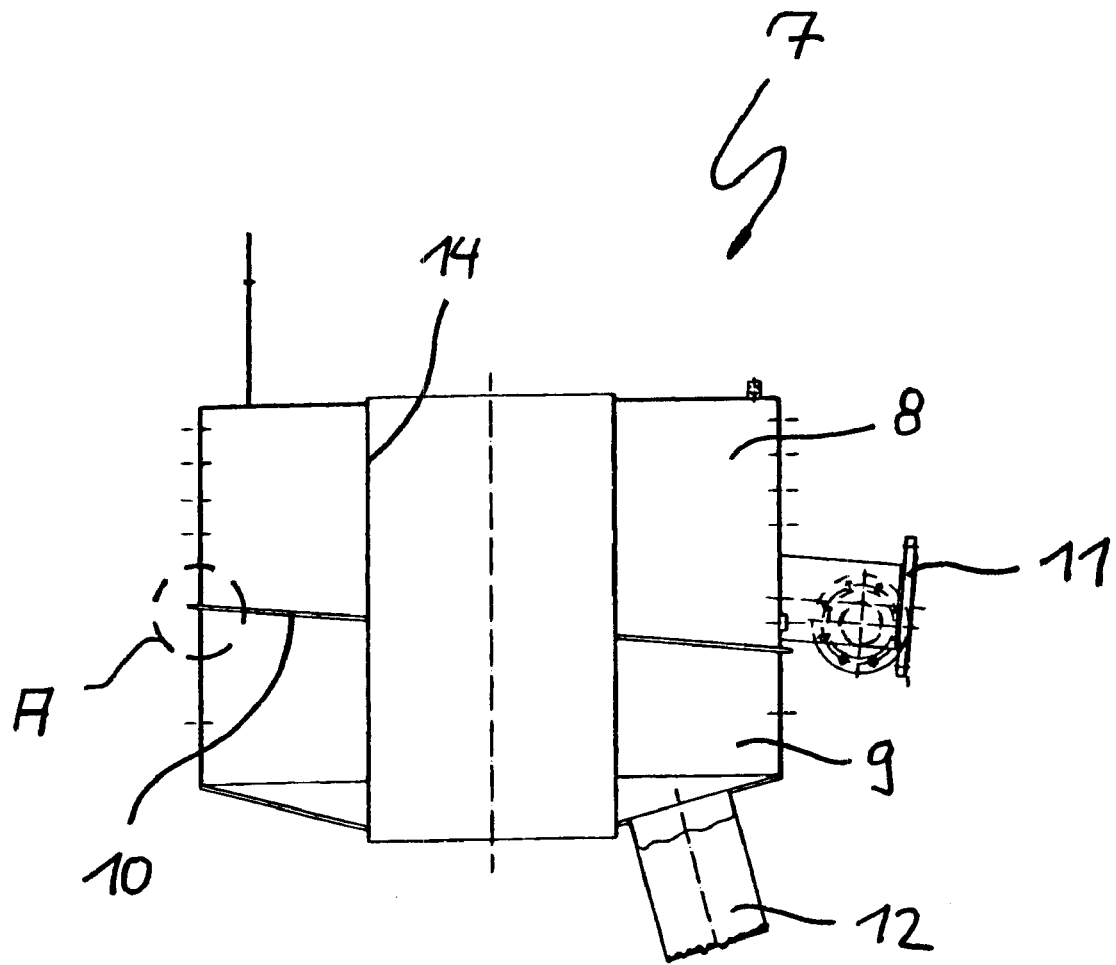
FIG. 5 is a cross-sectional view of a two-chamber vessel.

FIG. 5 shows the two-chamber vessel 7 with the two chambers 8 and 9, the partition 10, the pipe flange 11 and the main pipe 12 shown in incomplete manner in cross-section. The internal cylinder surfaces of the two chambers 8 and 9 are both formed by the continuous pipe section 14 in which the main shaft 16 of the lauter tun drive 3 runs after installation. The external cylinder surfaces of the two chambers 8 and 9, onto which the lauter collecting pipes and/or the partial stream pipes are flanged, are produced separately in each case and are fixed to the circular-disc-shaped partition 10 from the top and/or from the bottom by welding. To enable the wort to flow out of the upper chamber 8 through the flange 11 in pressureless manner, the component plane of the partition 10 runs at a sharp angle relative to the horizontal plane.

While specific embodiments of the invention have been shown and described in detail to illustrate the application of the principles of the invention, it will be understood that the invention may be embodied otherwise without departing from such principles.

What is claimed is:

1. A device for the feeding of mash into a lauter tun, comprising:
   a mash pump;
   a main pipe which is connected to said mash pump;
   at least two partial stream pipes, each partial stream pipe connecting said main pipe to a feed opening in the lauter tun to feed mash from a mash container into the lauter tun via said main pipe and the partial stream pipes when the mash pump is in operation; and
   a buffer vessel arranged between the main pipe and the partial stream pipes, wherein the feed openings in the lauter tun are arranged on an underside thereof.

2. A device according to claim 1, wherein all partial stream pipes have substantially the same line resistance.

3. A device according to claim 1, wherein all partial stream pipes have substantially the same pipe diameter and the same pipe length, provided as substantially identical constructions.

4. A device according to claim 1, wherein the lauter tun has at least two feed openings for the mash feed, all of which are arranged on an imaginary circular line, the center point of the circular line lying on a center axis of the lauter tun.

5. A device according to claim 1, wherein the buffer vessel is arranged centrically to the center axis of the lauter tun.

6. A device according to claim 1, wherein the cross-section of the buffer vessel is substantially a circular symmetrical form.

7. A device according to claim 1, further comprising a lauter tun drive with a main shaft, wherein the buffer vessel has a tubular passage, the diameter of which is at least slightly larger than a diameter of the main shaft of the lauter tun drive.

8. A device according to claim 1, further comprising a lauter collecting vessel wherein the buffer vessel and said lauter collecting vessel are combined in a two-chamber vessel with a chamber for receiving the mash and a chamber for receiving the wort being separated from each other in pressure-tight manner by at least one partition.

9. A device according to claim 8, wherein said chamber for receiving the mash is arranged underneath said chamber for receiving the wort in said two-chamber vessel.

10. A device according to claim 8, wherein said chamber for receiving said mash and said chamber for receiving the wort have substantially the same internal and/or external diameter.

11. A device according to claim 8, wherein said camber for receiving the mash and said chamber for receiving the wort are separated from one another by an annular partition.

12. A device according to claim 8, wherein the component plane of said partition runs at an angle of 1 to 30 degrees relative to a horizontal plane.

13. A device, comprising:
    a lauter tun;
    a mash pump;
    a main pipe which is connected to said mash pump;
    at least two partial stream pipes, each partial stream pipe connecting the main pipe to a feed opening in the lauter tun to feed mash from a mash container into the lauter tun via the main pipe and the partial stream pipes when the mash pump is in operation; and
    a buffer vessel arranged between the main pipe and the partial stream pipes, wherein the feed openings in the lauter tun are arranged on an underside thereof.

14. A device according to claim 13, wherein all partial stream pipes have substantially the same line resistance.

15. A device according to claim 13, wherein all partial stream pipes have substantially the same pipe diameter and the same pipe length, provided as substantially identical constructions.

16. A device according to claim 13, wherein the feed openings in the lauter tun are arranged on an underside thereof.

17. A device according to claim 13, wherein the lauter tun has at least two feed openings for the mash feed, all of which are arranged on an imaginary circular line, the center point of the circular line lying on a center axis of the lauter tun.

18. A device according to claim 13, wherein said buffer vessel is arranged centrically to the center axis of the lauter tun.

19. A device according to claim 13, further comprising a lauter collecting vessel wherein the buffer vessel and said lauter collecting vessel are combined in a two-chamber vessel with a chamber for receiving the mash and a chamber for receiving the wort being separated from each other in pressure-tight manner by at least one partition.

20. A device for the feeding of mash into a lauter tun, comprising:
    a mash pump;
    a main pipe which is connected to said mash pump;
    at least two partial stream pipes, each partial stream pipe connecting said main pipe to a feed opening in the lauter tun to feed mash from a mash container into the lauter tun via said main pipe and the partial stream pipes when the mash pump is in operation; and
    a buffer vessel arranged between the main pipe and the partial stream pipes, wherein the lauter tun has at least two feed openings for the mash feed, all of which are arranged on an imaginary circular line, the center point of the circular line lying on a center axis of the lauter tun.

21. A device according to claim 20, wherein the feed openings in the lauter tun are arranged on an underside thereof.

22. A device for the feeding of mash into a lauter tun, comprising:
- a mash pump;
- a main pipe which is connected to said mash pump;
- at least two partial stream pipes, each partial stream pipe connecting said main pipe to a feed opening in the lauter tun to feed mash from a mash container into the lauter tun via said main pipe and the partial stream pipes when the mash pump is in operation;
- a buffer vessel arranged between the main pipe and the partial stream pipes; and
- a lauter collecting vessel wherein the buffer vessel and said lauter collecting vessel are combined in a two-chamber vessel with a chamber for receiving the mash and a chamber for receiving the wort being separated from each other in pressure-tight manner by at least one partition.

23. A device according to claim 22, wherein the feed openings in the lauter tun are arranged on an underside thereof.

* * * * *